UNITED STATES PATENT OFFICE.

AUGUST LEOPOLD LASKA, OF OFFENBACH-ON-THE-MAIN, GERMANY, ASSIGNOR TO CORPORATION CHEMISCHE FABRIK GRIESHEIM-ELEKTRON, OF FRANKFORT-ON-THE-MAIN, GERMANY.

BROWN MORDANT AZO DYE.

964,919.  Specification of Letters Patent.  Patented July 19, 1910.

No Drawing.  Application filed April 13, 1910.  Serial No. 555,284.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with the post-office-address Gerberstrasse 5, have invented new and useful Improvements in Brown Mordant Azo Dyestuffs, of which the following is a specification.

My invention relates to the production of new mordant azo dyestuffs obtained by combining the diazo compounds of ortho-aminophenol bodies having the general formula:

$$C_6H.X.Y.SO_3H.OH.NH_2 \quad \overset{1.\ 2.}{}$$

wherein X and Y means H, $CH_3$, Cl, $NO_2$, COOH, with nitroaryl-meta-diamins of the formula $$C_6H_2.X.NO_2.NH_2.NH_2 \quad \overset{1.\ 3.}{}$$

wherein X means H or $CH_3$. These dyestuffs produce on wool by subsequent treatment with chromates from orange-brown to dark-brown shades of very good fastness. The following examples will serve to illustrate further the nature of my invention and how it may be carried out; parts being by weight.

Example I: 95 parts of ortho-aminophenolsulfonic acid are diazotized in the usual manner. The diazo solution is introduced into a solution of 90 parts of nitro-meta-phenylenediamin ($NO_2:NH_2:NH_2=1:2:4$) in 500 parts of water and 135 parts of hydrochloric acid (20° Bé.)

The temperature of the mixture is raised to 50° until the combination is complete. The dyestuff is precipitated by addition of common salt. It dissolves in form of its sodium salt in water with yellow-brown color and dyes wool by subsequent treatment with chromates reddish-brown shades of good fastness.

Example II: 117 parts of ortho-ortho-nitroamino-phenol-para-sulfonic acid are diazotized in the usual manner. The diazo solution is introduced into a solution of 90 parts of nitro-meta-phenylenediamin in 500 parts of water and 135 parts of hydrochloric acid (20° Bé.) The temperature of the mixture is raised to 50° and gradually to 70° until the formation of dyestuff is complete. The precipitation of the dyestuff is completed by addition of some common salt. The sodium salt of the dyestuff dissolves in water with reddish-brown color and dyes wool by subsequent treatment with chromates reddish-brown shades with a yellow bloom.

In the following table the properties of the new dyestuffs are given:

| Dyestuff prepared by combining— | | Dyes wool by subsequent treatment with chromates— |
|---|---|---|
| The diazo compound of— | With— | |
| Ortho-aminophenol-para-sulfonic acid. | Nitro-meta-phenylenediamin. | Reddish brown. |
| Aminokresolsulfonic acid. $OH:NH_2:CH_3:SO_3H-$ $1:2:4:6$ | ....do.......... | Reddish brown. |
| Para-chloro-ortho-aminophenol-ortho-sulfonic. | ....do.......... | Dark brown. |
| Ortho-ortho-nitroaminophenol-para-sulfonic acid. | ....do.......... | Reddish brown. |
| Do. | Nitro-meta-toluylenediamin. | Brown. |
| Aminosulfosalicylic acid. $OH:COOH:SO_3H:NH_2$ $1:2:4:6$ | Nitro-meta-phenylenediamin. | Orange brown. |

Now what I claim and desire to secure by Letters Patent is the following:

1. The process for the production of new mordant azo dyestuffs consisting in combining the diazo compounds of ortho-aminophenol bodies of the general formula $$C_6H.X.Y.SO_3H.OH.NH_2 \quad \overset{1.\ 3.}{}$$

wherein X and Y means $$H.CH_3.Cl.NO_2.COOH$$

with nitroaryl-meta-diamins of the formula $$C_6H_2.X.NO_2.NH_2.NH_2$$

wherein X means $H.CH_3$.

2. As new articles, the mordant azo dyestuffs obtained by combining the diazo-compounds of ortho-aminophenol bodies of the general formula:

$$C_6H.X.Y.SO_3H.OH.NH_2 \quad \overset{1.\ 2.}{}$$

wherein X and Y means $$H.CH_3.Cl.NO_2.COOH$$

with nitroaryl-meta-diamins of the formula:

$$C_6H_2.X.NO_2.NH_2.NH_2 \quad \overset{1.\ 3.}{}$$

wherein X means $H.CH_3$, said dyestuffs being in form of their alkali salts yellow-brown to red-brown powders, dissolving in water with yellow-brown to reddish brown color, in concentrated sulfuric acid with yellow brown color, dyeing wool by subsequent treatment with chromates orange-brown to dark-brown shades.

3. The process for the production of a new mordant azo dyestuff consisting in combining the diazo compound of orthoamino-phenolsulfonic acid with nitro-meta-phenylenediamin.

4. As a new article, the dyestuff obtained by combination of diazotized orthoamino-phenolsulfonic acid with nitro-meta-phenylenediamin, said dyestuff being in form of its alkali salts a brown powder, dissolving in water and concentrated sulfuric acid with yellow brown color and dyeing wool by subsequent treatment with chromates reddish brown shades.

In testimony that I claim the foregoing as my invention, I have signed my name in presence of two witnesses, this second day of April 1910.

AUGUST LEOPOLD LASKA.

Witnesses:
HERMANN WEST,
KATHINKA PFEIFFER.